United States Patent
Miao et al.

(10) Patent No.: US 9,966,094 B1
(45) Date of Patent: May 8, 2018

(54) QUADRATIC CURRENT SLEW CONTROL CIRCUIT

(71) Applicant: Marvell International Ltd., Hamilton (BM)

(72) Inventors: Xiao Yu Miao, Singapore (SG); Wei Guo, Singapore (SG)

(73) Assignee: Marvell International Ltd., Hamilton (BM)

(*) Notice: Subject to any disclaimer, the term of this patent is extended or adjusted under 35 U.S.C. 154(b) by 0 days. days.

(21) Appl. No.: 15/703,940

(22) Filed: Sep. 13, 2017

Related U.S. Application Data

(60) Provisional application No. 62/394,534, filed on Sep. 14, 2016.

(51) Int. Cl.
  *G11B 5/09* (2006.01)
  *G11B 5/55* (2006.01)
  *G11B 5/49* (2006.01)

(52) U.S. Cl.
  CPC .......... *G11B 5/5547* (2013.01); *G11B 5/4992* (2013.01)

(58) Field of Classification Search
  None
  See application file for complete search history.

(56) References Cited

U.S. PATENT DOCUMENTS

| | | | | |
|---|---|---|---|---|
| 4,879,610 A * | 11/1989 | Jove | .......................... | G11B 5/02 360/67 |
| 4,924,160 A * | 5/1990 | Tung | ...................... | G11B 5/556 187/293 |
| 5,020,044 A * | 5/1991 | Shimonou | .......... | G11B 7/08517 369/30.13 |
| 6,057,972 A * | 5/2000 | Castellucci | ............ | G01R 33/09 360/46 |
| 6,084,378 A * | 7/2000 | Carobolante | .......... | H02P 25/034 318/254.2 |
| 6,411,056 B1 * | 6/2002 | Ikedo | ..................... | G11B 19/28 318/400.2 |
| 6,586,980 B1 * | 7/2003 | Callahan, Jr. | ........... | G05F 3/262 327/132 |
| 2002/0015247 A1 * | 2/2002 | Rosky | .............. | G11B 20/10009 360/45 |
| 2008/0002267 A1 * | 1/2008 | Jang | ........................ | B82Y 10/00 360/46 |

* cited by examiner

*Primary Examiner* — Peter Vincent Agustin

(57) ABSTRACT

Systems and techniques relate to current slew control circuits. According to an aspect, a system implementing the quadratic slew control aspects comprises a disk; a read/write head; and a slew control circuit coupled to the read/write head, the slew control circuit configured to:
receive an input current signal, apply a slew current to the input current signal in response to a change in a power setting for the read/write head, and provide an output current signal that is adjusted to a quadratic current slew based on the applied slew current, the output current signal generating an output voltage characterized by a linear slew and controlling a movement of the read/write head over the disk.

20 Claims, 4 Drawing Sheets

QUADRATIC CURRENT SLEW CONTROL CIRCUIT

CROSS-REFERENCE TO RELATED APPLICATIONS

This disclosure claims the benefit of priority under 35 U.S.C. § 119(e) of U.S. Provisional Application Ser. No. 62/394,534, filed on Sep. 14, 2016, the disclosure of which is incorporated herein by reference in its entirety.

BACKGROUND

This disclosure relates to current slew control circuits.

Hard Disk Drives (HDD) are ubiquitous in the computing environment. Existing HDD systems employ magnetic-medium-based storage devices, and the data is typically stored on circular, concentric tracks on magnetic disk surfaces. A read-write head retrieves and records data on the magnetic layer of a rotating disk as it flies over the disk surface without contacting the disk surface. When retrieving data, magnetic field variations are converted into an analog electrical signal. The analog signal typically is amplified, converted to a digital signal, and interpreted. To guarantee the quality of the information saved on and read back from the disk, and to prevent damage of the head with disks spinning at high speeds, the read-write head should be accurately distanced from the disk. Some existing Fly Height Control (FHC) circuitry employ current slew control circuits to provide a linearly functioning current slew in driving the fly-height distance of the head from the disk during operation of the disk drives.

SUMMARY

This disclosure relates to current slew control circuits. The systems and techniques described herein can facilitate the implementation of a quadratic current slew control circuit. According to an aspect of the described systems and techniques, a system includes: a disk; a read/write head; and a slew control circuit coupled to the read/write head, the slew control circuit configured to: receive an input current signal, apply a slew current to the input current signal in response to a change in a power setting for the read/write head, and provide an output current signal that is adjusted to a quadratic current slew based on the applied slew current, the output current signal generates an output voltage characterized by a linear slew and controls a movement of the read/write head over the disk.

According to another aspect of the described systems and techniques, an integrated circuit includes: circuitry configured to receive an input current signal, and apply a slew current to the input current signal in response to a change in a power setting for a read/write head; circuitry configured to provide an output current signal that is adjusted to a quadratic current slew based on the applied slew current, the output current signal generates an output voltage characterized by a liner slew and controls a movement of the read/write head over a disk.

According to yet another aspect of the described systems and techniques, a method includes: receiving an input current signal; applying a slew current to the input current signal in response to a change in a power setting for the read/write head; and providing an output current signal that is adjusted to a quadratic current slew based on the applied slew current, the output current signal generating an output voltage characterized by a linear slew and controlling a movement of the read/write head over the disk.

The described systems and techniques can be implemented so as to realize one or more of the following potential advantages. For instance, implementations of the described quadratic current slew circuitry improve the accuracy of current output in comparison to conventional slew control circuits, as the quadratic current slew causes a linear slew of the output voltage in the FHC system. Also, the circuitry as described employs a quadratic current slew control that increases the control of slew from a linear first order slew (used in some existing slew control circuits) to a quadratic second order slew, thereby increasing precision of the circuitry. Moreover, the cascode current mirror is used to minimize the difference between output current and input current.

BRIEF DESCRIPTION OF THE DRAWINGS

Like reference symbols in the various drawings indicate like elements.

Certain illustrative aspects of the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

The systems and techniques described herein can be implemented as one or more devices, such as one or more integrated circuit (IC) devices, in a storage device. For example, they can be implemented in a read/write channel transceiver device suitable for use in a magnetic recording system.

Figure 1:
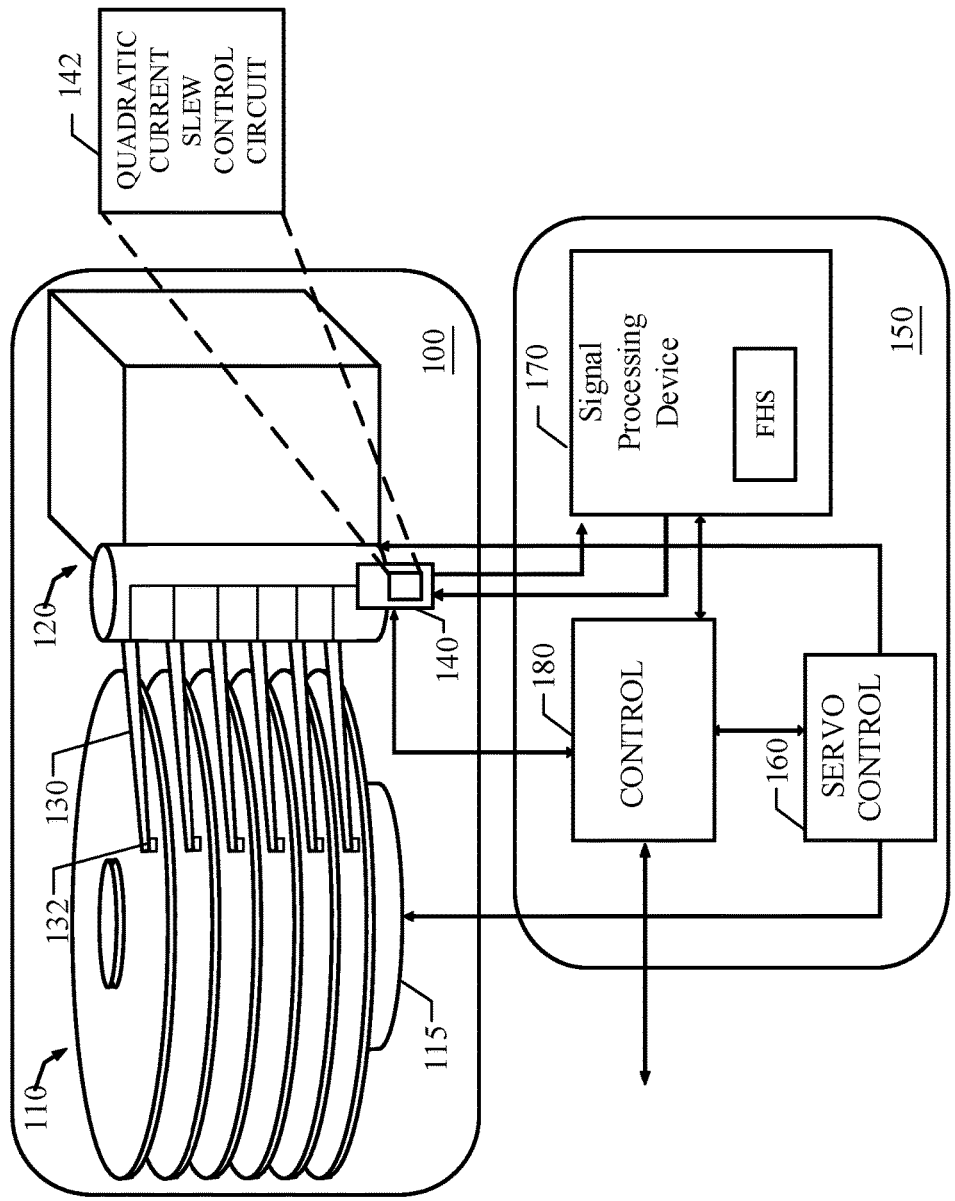
FIG. 1 shows an example of hard disk drive (HDD) architecture including quadratic current slew control circuitry.

FIG. 1 is a block diagram showing an example HDD, or magnetic-media disk drive, including quadratic current slew control circuit 142 as described herein. As shown in FIG. 1, the disk drive includes a head-disk assembly (HDA) 100 and drive electronics 150 (e.g., a printed circuit board assembly (PCBA) with semiconductor devices). The HDA 100 includes one or more disks 110 mounted on an integrated spindle and motor assembly 115. The spindle and motor assembly 115 rotates the disk(s) 110 under read/write head(s) 132 connected with a head assembly 120 in the HDA 100. The disk(s) 110 are coated with a magnetically hard material (e.g., a particulate surface or a thin-film surface) and can be written to, or read from, a single side or both sides of each disk.

A head 132 on an arm 130 is positioned as needed to read data on the disk 110. A motor, such as a voice coil motor (VCM), is used to position the head 132 over a desired track. The arm 130 is a pivoting or sliding arm that is spring-loaded to maintain a proper flying height for the head 132 in any drive orientation. In some embodiments, a closed-loop head positioning system is used. Additionally, the arm 130 can include electronics which enables control and operation of the arm 130, head 132, and related elements within the HDA 100.

In some implementations, the HDA 100 includes a preamp/writer 140 where head selection and sense current value(s) are set. The preamp/writer 140 amplifies a read signal before outputting it to signal processing device 170. In some implementations, the signal processing device 170 includes a read signal circuit, a servo signal processing circuit, and a write signal circuit. In some implementations, the signal processing device 170 is implemented on one or more integrated circuit (IC) devices.

In some implementations, a fly height control (FHC) concept involves embedding a separate heating element into the structure of head 132. A separate heating element structure enables the control of the read/write element protrusion independently from the effect generated by the read/write elements during read or write operations. To supply and control the necessary current to the separate heating element, circuitry can be included in the arm electronics. FIG. 1 shows quadratic current slew control circuit 142 included as an element in the preamp 140. In some implementations, the preamp 140 can also include circuitry or elements of the fly-height sensor (FHS), digital/analog converter (DAC), and driver. Preamp 140 can be generally characterized as having two main functions: read data from disk, and write data to the disk. Other than these two main functions and other functions, the preamp 140 also has circuits that process the fly-height sensor signal from head 132.

Various aspects of the heating element's functions, such as the current output, are manipulated by the quadratic current slew control circuit 142, and any additional circuitry within the arm electronics that are related to function of the heater such as a heater driver circuit.

The flying height is a measureable characteristic related to the spacing between the head 132 and a disk 110, for instance, while performing read/write maneuvers. In some implementations, some deviations from a predetermined flying height adversely impact the performance of the HDD (e.g., increased error rate). For example, during operation of the HDD, the fly height varies as a result of changes in environmental temperatures within the drive, or as a result of different orientations used during read or write operations. Because of environmental temperature changes, components of the HDD can heat-up (e.g., due to an increased duty cycle), and the higher temperature can cause physical deformation of some components. Consequently, if left uncompensated, the head 132 may protrude closer to an associated disk 110. As such, thermal deformation can cause flying height variations between reading operations and writing operations, respectively, and possible read or write errors. Thus, according to some implementations, the HDD includes components that provide various fly height control (FHC) functions, such as sensing and adjustably controlling fly height.

As a concept of FHC, applying heat to the head 132 results in an increased protrusion of the read/write elements thus reducing the spacing to the disk 110. Thus, an output current from a heating element that is applied to the head 132 causes a change in the spacing of the read/write elements to the disk 110. Since there is some time constant before the head 132 reaches a steady state temperature, the heating element is turned on at a certain time before the read or write operation can be executed. FHC generally involves adjusting the relationships between temperature, signals, and fly height for certain operational conditions. For instance, for FHC during the write operation, the current to the heater is reduced when the write current is applied. This is done because the application of current to the write element causes additional localized heating which produces additional protrusion; this effect is compensated by reducing the current to the heating element. The end result is a consistent spacing of the read/write elements to the disk throughout the write operation. During a write operation, the head 132 can be controlled by FHC to fly at an elevated height that does not cause undue contact friction on the disk. Conversely, during a read operation, the head 132 is at a fly height comparatively lower than during a write, thus causing the head 132 to be position closer to the disk. That is, a potential for inaccuracies can be caused by the head 132 flying at a height too removed from the surface of the disk 110. Accordingly, FHC determines certain amounts of power that are supplied to the heating element so that it can control and adjust the fly height of the head 132 over the disk 110 for the appropriate operation (i.e., read/write) and conditions. As an example, in write mode the range of applied power can be between 60 mW to 100 mW, and in read mode 90 mW to 130 mW.

Another consideration for FHC aspects of the HDD is the design tradeoff between quickly adjusting the applied power to provide quick transitions between read and write operations, and adjusting the applied power too rapidly which potentially causes signal coupling that may degrade the read/write signals. In some cases, as the applied power setting is changed, the output voltage will slew drastically, or in a non-linear manner. The voltage slew has characteristics that drive the amount of potentially degrading signal coupling that is experienced. Thus, the quadratic current slew control circuit 142 is configured to allow the applied power to be set in a range so that the heating element can switch quickly between functions, while minimizing signal coupling. According to some implementations, the power applied to the heating element, via the preamp 140, propagates though the quadratic current slew control circuit 142, which is configured to supply the appropriate current slew, in order for the output voltage to have a controlled linear slew.

FIG. 1 shows the drive electronics 150 as including a signal processing device 170, which is configured to perform signal analysis capabilities. The signal processing device 170 can operate as a sensor used for measuring, or otherwise determining, characteristics related to operation of the HDA 100. In some implementations, the signal processing device 170 is a sensor that is integrated into electronics of the hard disk drive system including, but not limited to, an Embedded Contact Sensor (ECS) or a fly height sensor (FHS). Accordingly, signal processing device 170 implements a fly-height sensor to measure, and subsequently control, parameters associated with fly height spacing concerns, such as the mechanical fly-height distance of the head 132 over the disk 110 (e.g., as a result of mechanical movement of the arm 130), and the physical distance that the head 132 further protrudes towards a surface of disk 110 (e.g., closeness of the head and disk as compared to an initial position at a nominal temperature). In some implementations, the drive electronics 150 can be implemented as an IC for hard disk, such as a System-On-Chip (SOC) or read channel.

In reference to FIG. 1, the signal processing device 170 is employed to determine whether a head 132 is operating at a fly height distance from a disk 110 that has been deemed appropriate or desirable. An operational fly height range is employable to enable the disk drive to maintain a flying height within a range of acceptable distances for effectively performing reading and/or writing of data in the drive (e.g., below a particular error rate). The signal processing device 170 receives a signal generated by a head 132 as input. The signal processing device 170 can further convey signals indicating a determined fly height to preamp 140, including the quadratic current slew circuit 142. For instance, an output signal generated by circuitry of the signal processing device 170 is translated to a DC signal and used to analyze how close the head 132 is to the disk 110. In an embodiment, the signal processing device 170 uses a peak voltage output as a comparative value that is measured against one or more threshold values corresponding to the same portion of the disk 110 being accessed during the measurement, where the threshold values can be predetermined voltages that indicate a minimum and/or maximum flying height linked to acceptable performance metrics of the disk drive. Based on the comparison using the detected peak voltage, signal processing device 170 establishes whether the measured fly height has exceeded a maximum threshold, or conversely has fallen below a minimum threshold, and thereby indicates that there is a potential error in the read/write of data on the accessed area of the disk. In some implementations, the signal processing device 170 generates signals that are communicated to the control circuitry 180, causing the disk drive to perform controlling or corrective actions (e.g., rewrite to the accessed portion of a disk, readjust the head positioning) in the event that an operational fly-height is determined to be outside of the acceptable range.

Signals between the HDA 100 and the drive electronics 150 are carried through a flexible printed cable, for example. A control circuitry 180 directs a servo controller 160 to control mechanical operations, such as head positioning through the head assembly 120 and rotational speed control through the motor assembly 115. The control circuitry 180 is disposed on one or more IC chips (e.g., a combo chip), in some implementations, which include read/write channel signal processing circuitry. In some implementations, the control circuitry 180 is implemented as a controller circuit providing an interface to the HDA 100, such as a hard disk controller. The drive electronics 150 also include various interfaces (not shown), such as a host-bus interface, and memory devices (not shown), such as a read only memory (ROM) for use by a microprocessor, and a random access memory (RAM) for use by a hard disk controller. Additionally, the read/write channel includes error correction circuitry (not shown), according to some implementations.

Figure 2:
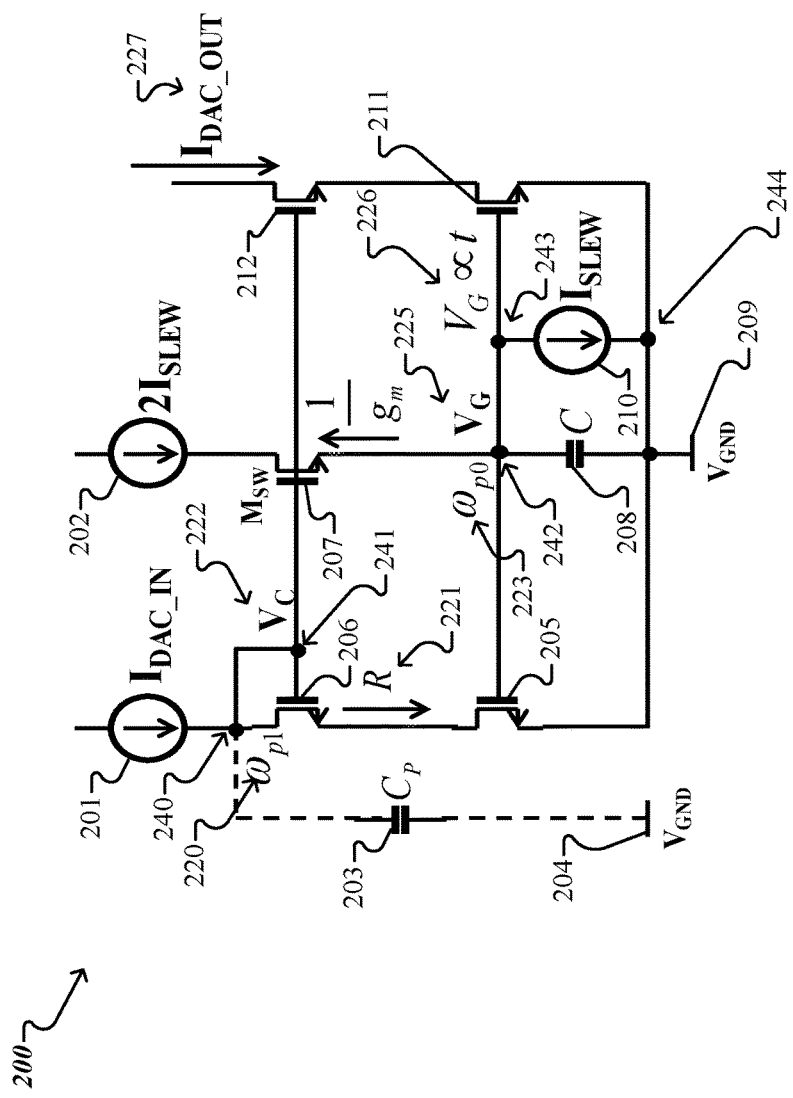
FIGS. 2-4 show examples of circuit configurations for quadratic current slew circuitry as implemented in a HDD architecture, such as the HDD architecture of FIG. 1.
Figure 3:
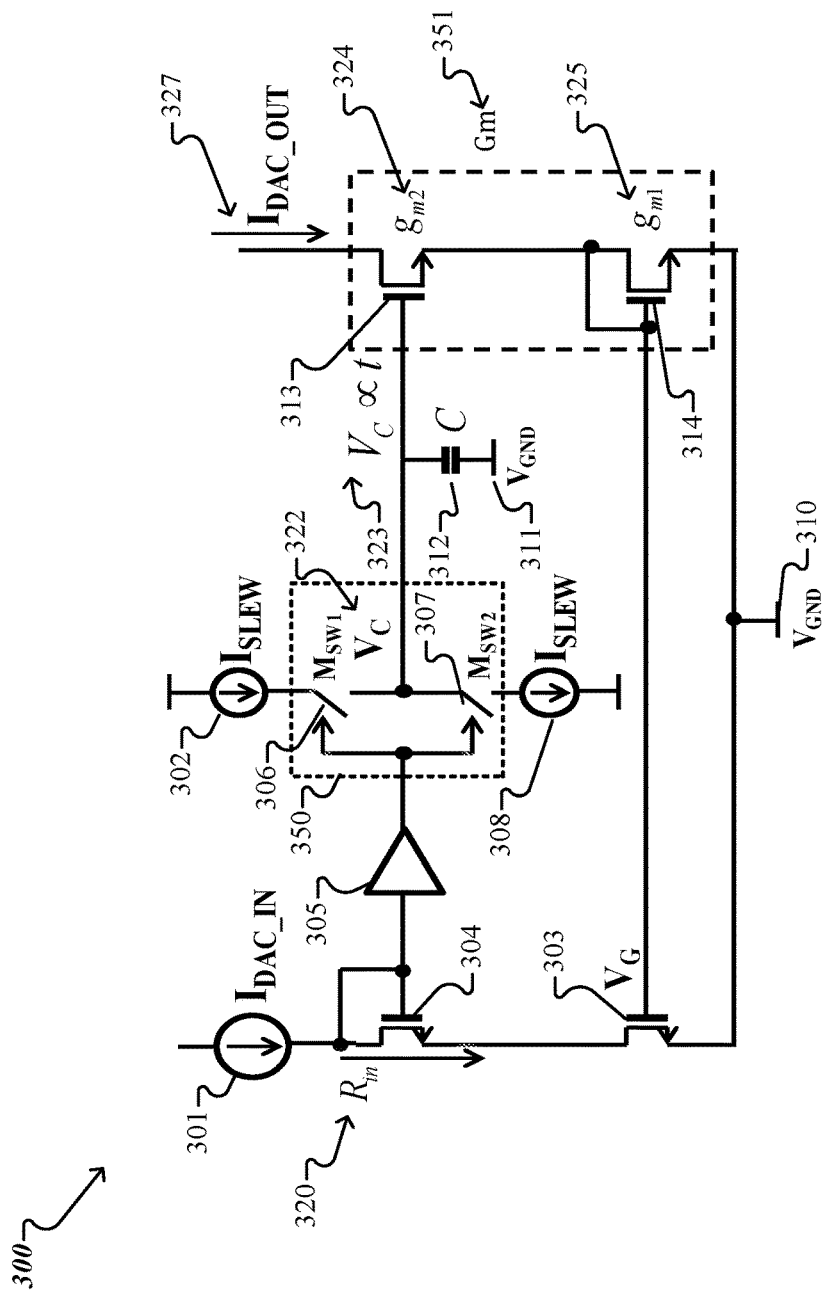
Figure 4:
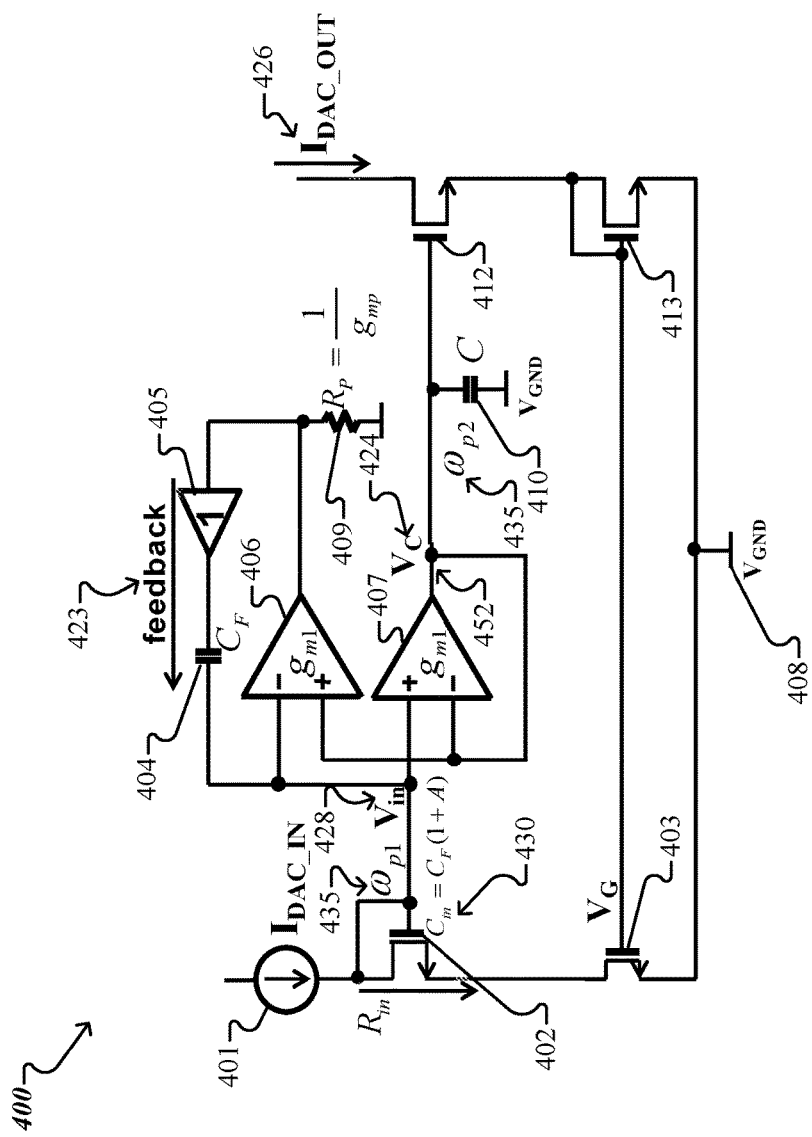

FIGS. 2-4 are examples of circuit configurations for a quadratic current slew control circuit such as the quadratic current slew control circuit 142 for implementing the slew control aspects of FHC as discussed in detail in reference to FIG. 1. For instance, in FIG. 2, the quadratic current slew control circuit 200 is usable for implementing several electro-mechanical applications related to fly height. The quadratic slew control circuit 200 can be generally described as a current mirror with a controlled current slew. According to the techniques disclosed, the current slew behaves as a quadratic, in order to produce an output voltage slew (for a heat driving circuit) that behaves linearly. Power (P) has a linear relationship with current (e.g., P=R×I$^2$). Thus, the output power has a linear relationship with the internal current, illustrated as current source $I_{DAC\_IN}$ 201. Further, by changing the $I_{DAC\_IN}$ 201, the output power will change linearly, for example from 0 to 200 mW. The current can be used to set the output power. A current slew control is applied to the $I_{DAC\_IN}$ 201. In some cases, the levels for the current setting is unknown, so the $I_{DAC\_IN}$ 201 is subject to be changed for adjustments. To account for changing the internal current, slew control can be integrated into a current mirror of circuit 200. Thus, the circuit 200 operates to mirror the $I_{DAC\_IN}$ 201 and output it as the $I_{DAC\_OUT}$ 227, at the same time shifting the slew of the changing current output. The $I_{DAC\_OUT}$ 227 can be the heating element output current. The slew control is implemented in a manner that allows an output voltage to change linearly, when the $I_{DAC\_IN}$ 201 changes.

Additionally, at steady state, the circuit 200 operates to produce an output current $I_{DAC\_OUT}$ 227 that has a fixed and accurate ratio to the input. For instance, the HDD shown in FIG. 1 can operate with the power setting at 80 mW at read state, which can be adjusted to 100 mW at a write state. In adjusting the output power for the corresponding operational state, the power is desirably set to an exact value, or steady state. Thus, the circuit 200 is configured to generate steady state functionality. Furthermore, as previously discussed, the circuit 200 provides an output current change that is quadratic, that is, the change in gate voltage $V_G$ 225 of the current mirror device is linear. The associated change of $V_G$ 255 over time, or the voltage slew, is illustrated as $V_{Gα}$ 226. A quadratic current slew for the circuit 200, effectuates the voltage to change linearly (i.e., linear voltage slew).

The $I_{DAC\_IN}$ 201 can be an input current that is characteristic of a square wave (e.g., without slew). In the event that the current changes, the current value for $I_{DAC\_IN}$ 201 will immediately and correspondingly change, as there is no slew. In turn, the gate voltage $V_G$ 225 will change linearly. The output $I_{DAC\_OUT}$ 227 will have a square relationship to the voltage, which causes a quadratic current slew in the current output of circuit 200.

FIG. 2 illustrates that the current source $I_{DAC\_IN}$ 201 is connected to node 240, which is also coupled to a terminal of capacitor 203. The opposing terminal of capacitor $C_P$ 203 is connected to ground 204. Furthermore, a collector terminal of transistor 206 is coupled to node 240. The emitter terminal of transistor 206 is connected to the collector terminal of another transistor 205. The coupling, such as wiring, between the transistors 206 and 205 is shown to have an associated resistance R 221. Also, the base terminal of transistor 206 is shown to be coupled to node 241. The node 240 is connected to the node 241, thereby connecting the base terminal and collector terminal of transistor 206. The node 241 is shown to have an associated voltage $V_C$ 222. In operation, in the case where $I_{DAC\_IN}$ 201 increases, the $V_C$ 222 also increases. The increase in voltage $V_C$ 222 serves to "turn on" transistor $M_{SW}$ 207. Conversely, if $I_{DAC\_IN}$ 201 decreases, $V_C$ 222 decreases to "turn off" $M_{SW}$ 207. $M_{SW}$ 207 is connected, via its collector terminal, to a current slew current source 2$I_{SLEW}$ 202. The emitter terminal of $M_{SW}$ 207 is coupled to node 242. The base terminal of $M_{SW}$ 207 is coupled to node 241. A terminal of capacitor C 208 is coupled to node 242, and the opposing terminal is coupled to ground 209. Node 242 is shown to have an associated voltage $V_G$ 225. FIG. 2 also illustrates a transconductance gm associated with transistor $M_{SW}$ 207. In field effect transistors, and metal oxide semiconductor field-effect transistors (MOSFETs) in particular, transconductance is the change in the drain current divided by the small change in the gate/source voltage. A relationship involving the gm for transistor $M_{SW}$ 207 is shown to be represented mathematically as:

$$\frac{1}{gm} \qquad (1)$$

Circuit 200 includes another current slew current source $I_{SLEW}$ 210 as shown. $I_{SLEW}$ 210 is shown as being coupled in parallel to capacitor C 208, between node 243 and node 244. Node 243 is illustrated as being associated with voltage slew $V_{Cas}$ 226. The base terminal of another transistor 211 is coupled to the node 243. The emitter terminal of transistor 211 is coupled to node 244. The collector terminal of transistor 211 is coupled to the emitter terminal of another transistor 212. $I_{DAC\_OUT}$ 227 is shown as propagating across the collector terminal of transistor 212. During operation of the circuit 200, in the case where the $I_{DAC\_IN}$ 201 increases, the $I_{SLEW}$ 210 charges C 208 until $I_{DAC\_OUT}$ 227 equals $I_{DAC\_IN}$ 201, allowing the circuit 200 to function as a cascode current mirror. In the case where $I_{DAC\_IN}$ 201 decreases, the $I_{SLEW}$ 210 discharges C 208 until $I_{DAC\_OUT}$ 227 equals $I_{DAC\_IN}$ 201 providing the current mirroring.

Additionally, the circuit 200 can include two opposing poles, illustrated as being associated with an angular frequency $\omega_{p1}$ 220 at node 240 and an angular frequency $\omega_{p0}$ 223 at node 242 which can drive certain signal characters of the circuitry. The angular frequency at a dominate pole, namely $\omega_{p0}$ 223 at node 242, can be represented by the inversely proportional relationship between the capacitance of C 208 and a transconductance gm 224 of transistor 207. The dominant pole angular frequency $\omega_{p0}$ 223 can be represented mathematically as:

$$\omega p0 = \frac{c}{gm} \quad (2)$$

The angular frequency at a subordinate pole, namely $\omega_{p1}$ 220 at node 240, can be represented as being inversely proportional to the resistance R 221 and capacitance of the capacitor $C_p$ 203. The subordinate pole angular frequency $\omega p1$ 220 can be represented mathematically as:

$$\omega p1 = \frac{1}{RCp} \text{ or } \omega p1 = \frac{1}{gm1} \quad (3)$$

In some cases, as $I_{DAC\_IN}$ 201 increases, $V_C$ 222 increases, which in turn increases $V_G$ 225. However, due to the opposing poles, and interaction between characteristics of the circuitry components, an increased $V_G$ 225 can cause $V_C$ 222 to be unintentionally pulled lower. The components within the circuit 200 can be close in proximity resulting in interference between the angular frequencies of the poles $\omega_{p0}$ 223 and $\omega_{p1}$ 220, and thereby potentially causing oscillation. It should be appreciated that alternative embodiments for the quadratic current slew control circuit, for example as discussed in reference to FIG. 3 and FIG. 4 can be configured to increase robustness of the circuitry and address these abovementioned scenarios (e.g., oscillation).

The configuration for the quadratic current slew circuit 200 shown in FIG. 2 can be generally described as a current mirror including four main loops in between the input current and output current. The structure of the circuit 200 can realize advantages associated with increased accuracy, due to the cascode current mirror structure (e.g., no mismatch between the input current and the output current). Also, there is no amplifier utilized in the circuit 200 as compared to some existing slew circuits, which eliminates an offset and improves the current mirroring accuracy. Moreover, advantages may be realized associated with the current slew being provided in the second order, or quadratic.

FIG. 3 shows another example of a circuit configuration for the quadratic current slew circuit 300 for implementing the slew control aspects of FHC. The circuit 300 can be generally described as differing from the multiple loop circuit structure of the configuration shown in FIG. 2, with use of a single loop structure used between $I_{DAC\_IN}$ 301 and $I_{DAC\_OUT}$ 327. The loop serves to couple transistor 304, diode 305, switches $M_{SW1}$ 306 and $M_{SW2}$ 307, capacitor C 312, transistor 313, transistor 314, and transistor 303. The emitter terminals of transistor 303 and transistor 314 are both coupled to ground 310. The current slew current sources, $I_{SLEW}$ 302 and $I_{SLEW}$ 308 are coupled to a terminal of switches $M_{SW1}$ 306 and $M_{SW2}$ 307 respectively.

The coupled switches $M_{SW1}$ 306 and $M_{SW2}$ 307 form a comparator portion 350 (represented by dashed line box) of circuitry 300. As $I_{DAC\_IN}$ 301 changes, the comparator 350 functions to effectuate either a charging or discharging of $V_C$ 322 based on a comparison of a current value for $I_{DAC\_IN}$ 301 as it relates to its previous value. For example, in a case where the input current for $I_{DAC\_IN}$ 301 has increased from a current value at a time prior, the comparator 350 functions to "turn on" $M_{SW1}$ 306 (closes switch). Thus, allowing the current provided by $I_{SLEW}$ 302 to propagate to and charge $V_C$ 322, thereby adjusting for a higher current slew.

Conversely, in a case in which the comparator 350 determines that $I_{DAC\_IN}$ 301 has decreased in value from a current value at a time prior, the comparator 350 will then "turn on" $M_{SW2}$ 308 (and turning off $M_{SW1}$ 306) causing the $V_C$ 322 to discharge. Thus, the comparator 350 can adjust for a lower current slew, if $I_{DAC\_IN}$ 301 changes to reduce the current.

A terminal for capacitor C 312 is coupled to loop wire, while the opposing terminal is coupled to ground 311. The terminal of C 312 coupled to the loop wire is illustrated as being associated with voltage slew $V_{Cas}$ 323. A resistance $R_{in}$ 320 is shown across transistor 304. During operation of the circuit 300, when $I_{DAC\_IN}$ 301 changes, C 312 is charged, or discharged by $I_{SLEW}$. The circuit 300 is configured to allow a second order current slew represented mathematically as:

$$I_{DAC\_OUT} \alpha (V_c - V_{th})^2 \sim V_c^2 \quad (4)$$

FIG. 3 illustrates that transistors 313, 314 are associated with transconductance gm2 324 and gm1 325 respectively. Also, an overall transconductance Gm 350 is displayed, which represents a transconductance associated with a combination of circuit elements (represented by dashed line box). In some embodiments, the circuit 300 is designed to be characteristically have a gm2 324 that is substantially larger than gm1 325. Accordingly, as the $V_C$ 322 changes, the circuit 300 can have an overall Gm that will be approximately equal to gm1 325. This concept relating the overall Gm 351 can be represented mathematically by:

$$Gm = \frac{gm2}{1 + \frac{gm2}{gm1}} \approx gm1 \quad (5)$$

That is, in scenarios when gm2 324 is appropriately large, the above equation can be reduced to yield an overall Gm 351 that will be approximately equivalent to gm1 325. Even further, an overall transconductance equivalent to gm1 325 also has an associated current that is linear to $V_C$ 322, and thus produces an output current change that is quadratic. As a general description, $V_C$ 322 can be linearly changed, and $I_{DAC\_OUT}$ 327 can be quadratically changed.

FIG. 4 shows another example of a circuit configuration for the quadratic current slew control circuit 400 for implementing the slew control aspects of FHC. In some cases when $V_c$ approaches a $V_{in}$ in the circuit configuration 300 (shown in FIG. 3), $M_{SW1}$ and $M_{SW2}$ can become saturated. In order to compensate for the potential of saturation, configuration of circuit 400 integrates a feedback path 423. The circuit 400 includes a loop between $I_{DAC\_IN}$ 401 and $I_{DAC\_OUT}$ 426. The loop serves to couple various elements of the circuit 400, including: the transistor 402, an amplifier 407, a capacitor C 410, the transistor 412, the transistor 403, and transistor 413. The transistors 403, 413 are connected to ground 408.

The feedback path 423 couples amplifier 406, resistor $R_p$ 409, diode 405, and capacitor $C_F$ 404. The feedback amplifier 406 is shown to have a negative input terminal coupled to the positive input terminal of amplifier 407. Additionally, the feedback amplifier 406 is shown to have its positive (+) input terminal coupled to the negative (−) input terminal of amplifier 407. The output terminal of amplifier 407 is coupled to node 452. Node 452 is illustrated to be associated with a node voltage $V_c$ 424.

The negative feedback path 423 is formed with the feedback capacitor $C_F$ 404, that can be mathematically represented as:

$$C_{in} = C_F(1+A) \quad (6)$$

where A is the loop gain of the feedback path 423.

As the input current $I_{DAC\_IN}$ 401 is received by the circuit 400, the amplifier 406 drives the $V_C$ 424 to cause $I_{DAC\_OUT}$ 426 to change, or otherwise slew, as a quadratic. Also, if Vc 424 decreases, then a transconductance associated with amplifier 406 (represented as gm1) can function as an applied current source to implement the techniques for controlling current slew (similar to $I_{SLEW}$).

As a conventional design consideration, incorporating amplifiers into circuitry can introduce an offset. In circuit 400, an offset can potentially affect accuracy of the circuitry's function. Therefore, the circuit 400 includes the negative feedback path 243 to counteract the effects of amplifier offset and maintain stability in the feedback loop. During operation, $V_{in}$ 428 can be changed in manner that causes $C_F$ 404 to be amplified. Amplification of $C_F$ 404 can involve loading a large capacitance corresponding to $C_F$ 404 at the node associated with $V_{in}$ 428. Consequently, amplifying can create a dominate pole to form at the node. The dominate pole is illustrated in FIG. 4 by angular frequency $\omega p1$ 435, that results as $C_{in}$ 430>>C 410. Furthermore, as $\omega p1$ 435<$\omega p2$ 435, it reduces the potential of oscillation (e.g., due to proximity of Vin and Vc) that may be associated with other configurations.

The techniques and circuitry described herein implement a quadratic current slew control circuit that functions to improve accuracy of some existing current slew circuits through use of a current mirroring structure, and quadratic current slew. It should be appreciated that the various circuit configurations for the quadratic current slew control circuit presented in FIGS. 2-4 consider certain design tradeoffs that can improve on drawbacks associated with some configurations and be better suited for specific designs and operations.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including system on chip (SoC) implementations, which can include one or more controllers and embedded code.

While this specification contains many specifics, these should not be construed as limitations on the scope of what may be claimed, but rather as descriptions of features that may be specific to particular implementations. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

Other implementations fall within the scope of the following claims.

What is claimed is:

1. A hard disk drive (HDD) system comprising:
   a disk;
   a read/write head; and
   a slew control circuit coupled to the read/write head, the slew control circuit configured to:
   receive an input current signal,
   apply a slew current to the input current signal in response to a change in a power setting for the read/write head, and
   provide an output current signal that is adjusted to a quadratic current slew based on the applied slew current, the output current signal generates an output voltage characterized by a linear slew and controls a movement of the read/write head over the disk.

2. The hard disk drive of claim 1, wherein the slew control circuit comprises a cascode current mirror that applies the slew current to the input current signal to adjust the output current signal.

3. The hard disk drive of claim 1, wherein the slew control circuit comprises a capacitor that charges or discharges to apply the slew current to the input current signal to adjust the output current signal.

4. The hard disk drive of claim 3, wherein the slew control circuit comprises a current source that charges the capacitor to apply the slew current to the input current signal to adjust the output current signal.

5. The hard disk drive of claim 3, wherein the slew control circuit comprises a current source that discharges the capacitor to apply the slew current to the input current signal to adjust the output current signal.

6. The hard disk drive of claim 1, wherein the slew control circuit comprises one or more switches that are controlled by the input current signal to apply the slew current to the input current signal to adjust the output current signal.

7. The hard disk drive of claim 1, wherein the slew control circuit comprises an operational amplifier that applies the slew current to the input current signal to adjust the output current signal.

8. The hard disk drive of claim 7, wherein the slew control circuit comprises a negative feedback path that counteracts effects of amplifier offset of the operational amplifier.

9. An apparatus comprising:
circuitry configured to receive an input current signal, and apply a slew current to the input current signal in response to a change in a power setting for a read/write head;
circuitry configured to provide an output current signal that is adjusted to a quadratic current slew based on the applied slew current, the output current signal generates an output voltage characterized by a liner slew and controls a movement of the read/write head over a disk.

10. The apparatus of claim 9, further comprising a cascode current mirror that applies the slew current to the input current signal to adjust the output current signal.

11. The apparatus of claim 9, further comprising a capacitor that charges or discharges to apply the slew current to the input current signal to adjust the output current signal.

12. The apparatus of claim 11, further comprising a current source that charges the capacitor to apply the slew current to the input current signal to adjust the output current signal.

13. The apparatus of claim 11, further comprising a current source that discharges the capacitor to apply the slew current to the input current signal to adjust the output current signal.

14. The apparatus of claim 11, further comprising one or more switches that are controlled by the input current signal to apply the slew current to the input current signal to adjust the output current signal.

15. The apparatus of claim 11, further comprising an operational amplifier that applies the slew current to the input current signal to adjust the output current signal.

16. The apparatus of claim 15, further comprising a negative feedback path that counteracts effects of amplifier offset of the operational amplifier.

17. A method comprising:
receiving an input current signal;
applying a slew current to the input current signal in response to a change in a power setting for the read/write head; and
providing an output current signal that is adjusted to a quadratic current slew based on the applied slew current, the output current signal generating an output voltage characterized by a linear slew and controlling a movement of the read/write head over the disk.

18. The method of claim 17, wherein applying the slew current to the input current signal comprises:
charging or discharging a capacitor based on the input current signal.

19. The method of claim 17, wherein applying the slew current to the input current signal comprises:
controlling one or more switches based on the input current signal.

20. The method of claim 17, wherein applying the slew current to the input current signal comprises:
providing the input current signal to an operational amplifier.

* * * * *